(12) United States Patent
Manion et al.

(10) Patent No.: US 7,895,345 B2
(45) Date of Patent: Feb. 22, 2011

(54) DISTRIBUTED ROUTING TABLE ARCHITECTURE AND DESIGN

(75) Inventors: Todd R. Manion, Bellevue, WA (US); Kevin Charles Ransom, Duval, WA (US); Jeremy L. Dewey, Redmond, WA (US); Scott A. Senkeresty, Duval, WA (US); Brian R. Lieuallen, Redmond, WA (US); Pritam De, Redmond, WA (US); Sandeep Kishan Singhal, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 755 days.

(21) Appl. No.: 11/786,820

(22) Filed: Apr. 13, 2007

(65) Prior Publication Data
US 2008/0253306 A1   Oct. 16, 2008

(51) Int. Cl.
G06F 15/16 (2006.01)
(52) U.S. Cl. ...................................... 709/230; 709/227
(58) Field of Classification Search ................. 709/243, 709/227, 230; 370/395.31
See application file for complete search history.

(56) References Cited

U.S. PATENT DOCUMENTS

| | | | |
|---|---|---|---|
| 6,850,492 B2 | 2/2005 | Chander et al. | |
| 6,990,103 B1 | 1/2006 | Gollamudi | |
| 7,065,587 B2 * | 6/2006 | Huitema et al. | 709/243 |
| 2003/0055892 A1 * | 3/2003 | Huitema et al. | 709/204 |
| 2004/0054807 A1 | 3/2004 | Harvey et al. | |
| 2004/0190477 A1 | 9/2004 | Olson et al. | |
| 2005/0111384 A1 | 5/2005 | Ishihara et al. | |
| 2005/0135381 A1 | 6/2005 | Dubnicki et al. | |
| 2006/0193265 A1 | 8/2006 | Simionescu et al. | |
| 2006/0230446 A1 | 10/2006 | Vu | |
| 2007/0002869 A1 | 1/2007 | Miller | |
| 2007/0206537 A1 * | 9/2007 | Cam-Winget et al. | 370/331 |
| 2008/0049643 A1 * | 2/2008 | Arcese et al. | 370/395.31 |
| 2008/0225860 A1 * | 9/2008 | Manion et al. | 370/395.31 |
| 2008/0253306 A1 * | 10/2008 | Manion et al. | 370/255 |
| 2008/0313500 A1 * | 12/2008 | Strauss et al. | 714/37 |
| 2009/0016355 A1 * | 1/2009 | Moyes | 370/395.31 |
| 2009/0089078 A1 * | 4/2009 | Bursey | 382/293 |

* cited by examiner

*Primary Examiner*—Ajay Bhatia (57) ABSTRACT

A Distributed Routing Table (DRT) mesh can comprise two or more nodes, each of which maintains its own routing table that represents some or all of the overall routing knowledge of the DRT mesh. Each node can be comprised of modular components that can perform various defined functions such that the features and abilities of the node can be customized by an application based on which modular components are instantiated. A routing table management module can maintain individual routing tables at each node, and can ensure that only entries that are close to the node, in a network topology sense, are maintained in the routing table. In addition, a security module can verify received messages based on an agreed-upon root certificate.

12 Claims, 7 Drawing Sheets

DISTRIBUTED ROUTING TABLE ARCHITECTURE AND DESIGN

BACKGROUND

A network of computing devices often includes at least one computing device that functions as a "router," directing message traffic on the network. Traditionally, routers connect two or more sub-networks such that messages between computing devices on different sub-networks are directed to the appropriate sub-network for delivery to their targeted destination. At the center of a router's functionality is a "routing table" that correlates identifiers of individual computing devices to network paths that can be used to reach that computer. Routing tables can be implemented in a variety of ways, and are not limited to traditional look-up tables. Indeed, while a traditional look-up table can be suitable for implementing routing tables for networks comprising a limited number of computing devices, router tables for large networks, such as the ubiquitous Internet, that comprise millions of individual computing devices can instead be implemented in uniquely structured forms designed for highly efficient information retrieval.

The information contained within a routing table can likewise vary depending on the type of routing used. For example, in a simple routing scheme known as "hop-by-hop routing", the routing table can correlate identifiers of individual computing devices to the address of the next device along the path to that destination; in other words, the next "hop." Alternatively, more complex routing schemes are based on knowledge of network topology and, consequently, a routing table in such a scheme can correlate identifiers of individual computing devices to one or more paths to that computing device.

Because a router can comprise information critical to inter-network communication, it can easily become a bottleneck for network communication. For example, if a router becomes clogged or non-responsive, it can slow down, or even interrupt, various network communications. To eliminate such a bottleneck, distributed routing tables (DRTs) can be used, whereby multiple computing devices can each host some or all of a routing table that can be used in a distributed fashion. For example, each one of multiple computing devices can host a portion of a DRT that comprises information regarding a subset of computing devices on the network. Thus, for each message received by a computing device that is not destined for that device, the computing device can reference its portion of the DRT and identify another computing device that may be more likely to be able to ultimately deliver that message to its intended recipient. Unlike a centralized router, which can no longer direct messages to their intended destination when it fails, a DRT can continue to direct messages even if one or more computing devices fail. In such a failure scenario, the remaining, operational, computing devices simply direct messages to other, still operational, computing devices, and thereby ultimately deliver messages to their intended destinations.

SUMMARY

Multiple applications, executing on one or more computing devices, can implement inter-application communication based on a distributed routing table topology. To minimize the opportunity for malicious behavior among these applications, messages can, in one embodiment, be signed by a certificate that is derived from a root certificate. Thus, received messages can first be verified to have been properly signed by a certificate, and, subsequently, the certificate itself can be verified to ensure that it is properly derived from one or more pre-selected root certificates. Such verifications can be performed by a modularized security module that, due to its modularized design, can be efficiently substituted by another security module that can be based on alternative security mechanisms Such a modularized approach can be applied to additional elements used in the operation of the DRT, providing greater flexibility to those applications implementing the DRT network. For example, in one embodiment, a modularized transport module can be used to enable the applications to communicate using any one of a number of unique network communication protocols. Thus, one transport module could implement communications using the ubiquitous Transmission Control Protocol (TCP), while another transport module could implement communications using some other protocol, such as the User Datagram Protocol (UDP). Similarly, a modularized bootstrap module can be used to enable applications to form and join DRT networks based on a variety of peer-to-peer protocols or other name resolution protocols. For example, one bootstrap module could enable the formation and joining of DRT networks based on the Peer Name Resolution Protocol (PNRP), while another bootstrap module could work with the Domain Name Service (DNS).

Among the modules used in the operation of the DRT, one embodiment contemplates the existence of a routing table management module that can maintain a routing table based on network locality. More specifically, the entries in each individual routing table of the DRT identify computing devices that are "close," in a network topology sense, to the computing device on which the routing table management module executes. Such "close" entries can be maintained by comparing, for example, the round trip time of communications with a device about to be added to the routing table with the round trip time of devices already in the table, and adding the new device to the table only if the round trip time of communications to the new device is shorter. By providing a routing table that references local computing devices, the overall efficiency of the DRT network can be increased.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to mechanisms for implementing and using a network of computing devices relying on a distributed routing table (DRT). In particular, each computing device can host one or more application programs that can act as endpoints of the DRT-based network. The application programs can instantiate processes that can maintain each individual portion of the DRT, and that can further provide communicational and security infrastructure, enabling the application programs to create and use a network relying on the DRT.

Various tasks relevant to the implementation of the DRT can be componentized such that interchangeable components can provide a broad range of functionality. In one embodiment, a security module can be selected by an application program from among one or more security modules, where each security module can verify incoming messages according to the particular security strategy being implemented by that module. In another embodiment, a transport module can be selected by an application program from among one or more transport modules, where each transport module can provide communications using a different network transport protocol. Likewise, further embodiments contemplate a bootstrap module or logging module, each of which can be selected by an application program from among one or more modules providing the same basic functionality, but each implementing mechanisms specific to that module.

A still further embodiment contemplates a routing table management module that can manage the entries for each portion of the DRT to ensure that the entries in each routing table identify computing devices that are proximate, in the network topology, to the computing device. In one embodiment, the closeness of an entry, or potential entry, in the routing table can be determined by the round trip time for communications between the computing device identified by the entry and the computing device on which the routing table management module is executing. Thus, if the routing table already comprises a sufficient number of entries, then, in one embodiment, a potential entry can be added only if its round trip time is less than the round trip time of at least one entry currently in the routing table. In an alternative embodiment, entries can be freely added to the routing table, but the routing table management module can, periodically, or as otherwise requested, test the round trip time of one or more entries in the routing table, and can discard those entries whose round trip time is greater than determined threshold, or retain only a threshold number of entries.

In another embodiment, a security module can apply security based on one or more predefined root certificates. Specifically, upon receipt of messages related to the management of the DRT-based network, such a security module can verify both that the received message was properly signed by a certificate provided with the message, and that the provided certificate comprises a certificate chain that leads back to one of the predefined root certificates. The root certificates can be provided by either a local certificate authority (CA), or by an external CA, such as any of the commercial CA who sell and provide services over the Internet.

The techniques described herein focus on, but are not limited to, the mechanisms used to create, join and manage a network of multiple application programs executing on one or more physical computing devices, with each computing device physically networked to the other computing devices through one or more sub-networks. To distinguish between the physical network connections between computing devices, and the series of inter-communicating application programs, the latter will be referred to as a "mesh." Thus, a mesh that uses a distributed routing table (DRT) to route messages within the mesh will be referred to as a "DRT mesh."

Figure 1:
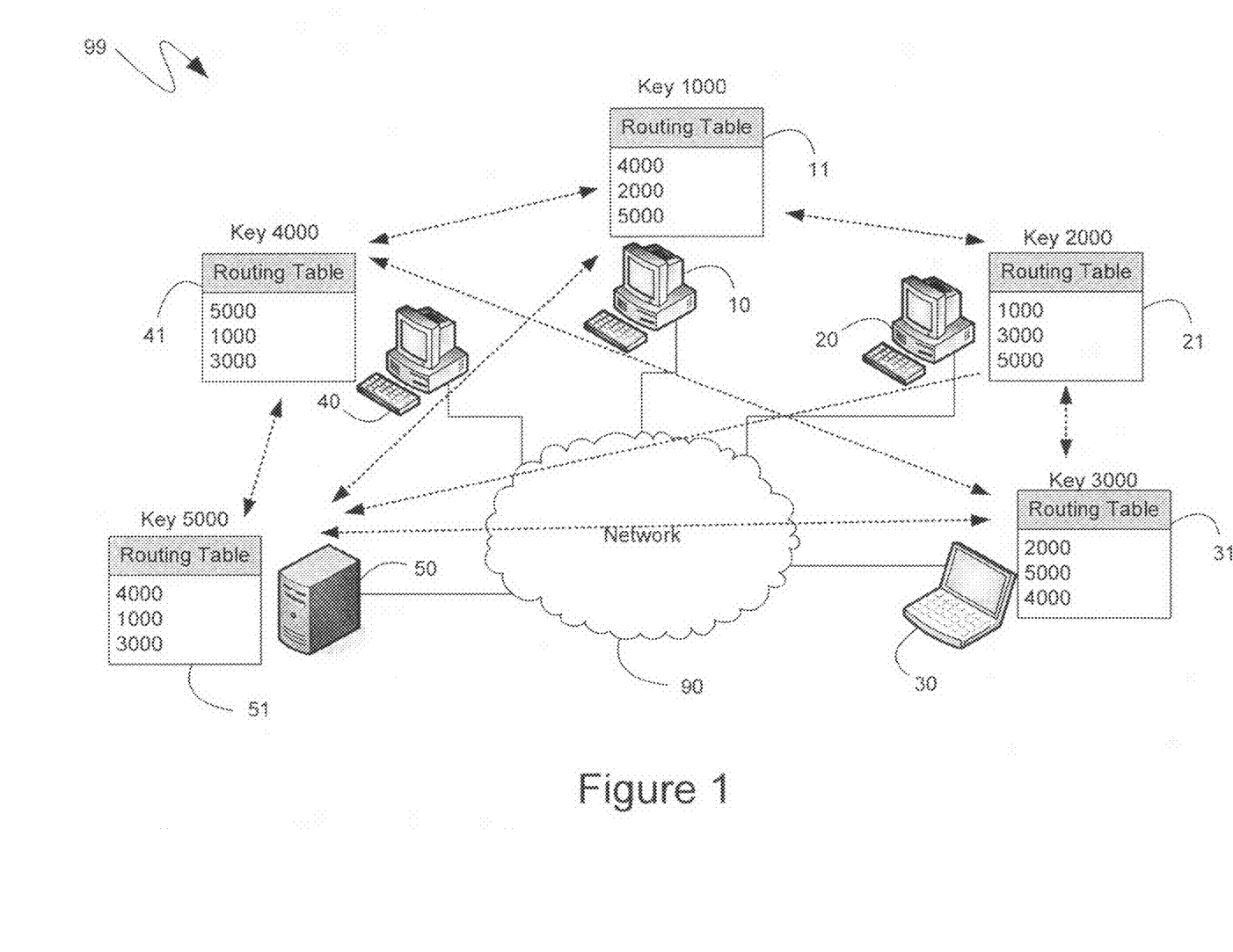
FIG. 1 is a network diagram of an exemplary DRT network.

Turning to FIG. 1, an exemplary DRT mesh 99 is illustrated comprising computing devices 10, 20, 30, 40 and 50 networked together through network 90. In the exemplary DRT mesh 99 shown, each of the participating computing devices 10, 20, 30, 40 and 50 can comprise a key and a routing table. Each key can act as a unique identifier of, either the computing device itself, or of a particular process or application executing on the computing device. For example, the ubiquitous Internet Protocol (IP) address is a type of key used to identify endpoints in networks conforming to the Internet Protocol. In the illustrated exemplary DRT mesh 99, computing devices 10, 20, 30, 40 and 50 have been assigned keys 1000, 2000, 3000, 4000 and 5000, respectively.

Each of the routing tables 11, 21, 31, 41 and 51, of the computing devices 10, 20, 30, 40 and 50, respectively, only comprises a portion of the routing information available. Instead, it is the combination of routing tables 11, 21, 31, 41 and 51 that acts as a single, distributed, routing table for the DRT mesh 99. For example, to send a communication to computing device 40, the computing device 20 can first determine that the key it is searching for is key 4000. Once it has identified the key 4000, the computing device 20 can reference its routing table 21 to search for the closest entry to the key 4000. In the routing table 21, the computing device 20 can identify either key 3000 or key 5000 as being closest. Selecting key 3000, for example, can cause the computing device 20 to initiate communications with computing device 30, identified by key 3000, and request that the computing device 30 forward communications from computing device 20 to a computing device having key 4000. Computing device 30 can reference its own routing table 31, and can identify the key 4000. Consequently, forward the communications from the computing device 20 to the computing device 40, having key 4000. In such a manner, communications can be routed among any of the computing devices participating in the DRT mesh 99 of FIG. 1, even though each computing device comprises only a portion of an overall routing table.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing devices, as the mechanisms may also be practiced in distributed computing environments where tasks are performed by remote processing devices that are linked through a communications network. In a distributed computing environment, program modules may be located in both local and remote memory storage devices.

Figure 2:
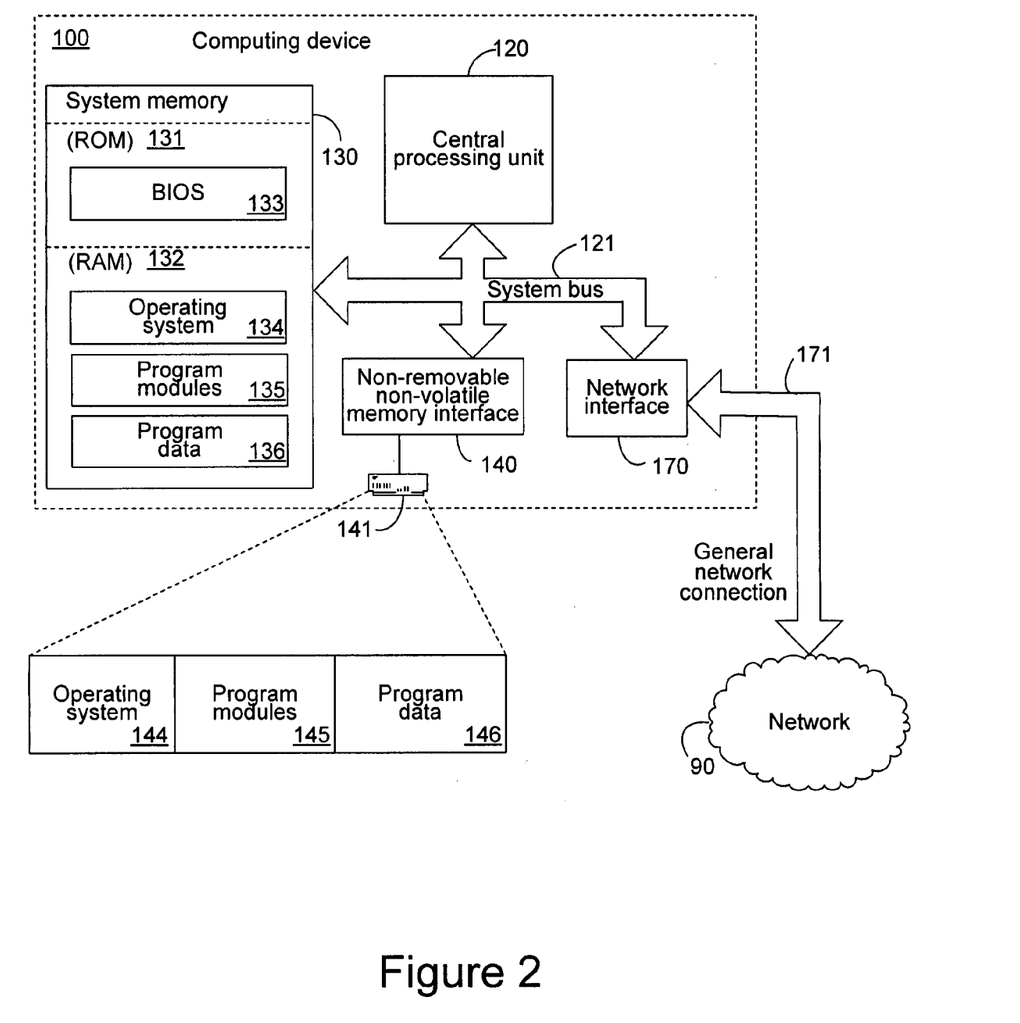
FIG. 2 is a block diagram of an exemplary computing device.

With reference to FIG. 2, an exemplary computing device 100 is illustrated. The computing device 100 can represent any of the computing devices 10, 20, 30, 40 and 50 of FIG. 1. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates an operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Of relevance to the descriptions below, the computing device 100 may operate in a networked environment using logical connections to one or more remote computers. For simplicity of illustration, the computing device 100 is shown in FIG. 2 to be connected to a network 90 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121, though it will be appreciated that the network connections shown are exemplary and other means of establishing a communications link may be used.

In a networked environment, program modules depicted relative to the computing device 100, or portions or peripherals thereof, may be stored in the memory of one or more other computing devices that are communicatively coupled to the computing device 100 through the general network connection 171. Likewise, the operating system 144 and program modules 145 can communicate with other operating systems and program modules executing on other computing devices to which the computing device 100 may be communicatively coupled via the general network connection 171 and the network 90. In one embodiment, the program modules 145 comprise at least one application that communicates with other applications, executing on other computing devices, via a DRT mesh, such as the DRT mesh 99 of FIG. 1, implemented across network 90.

Figure 3:
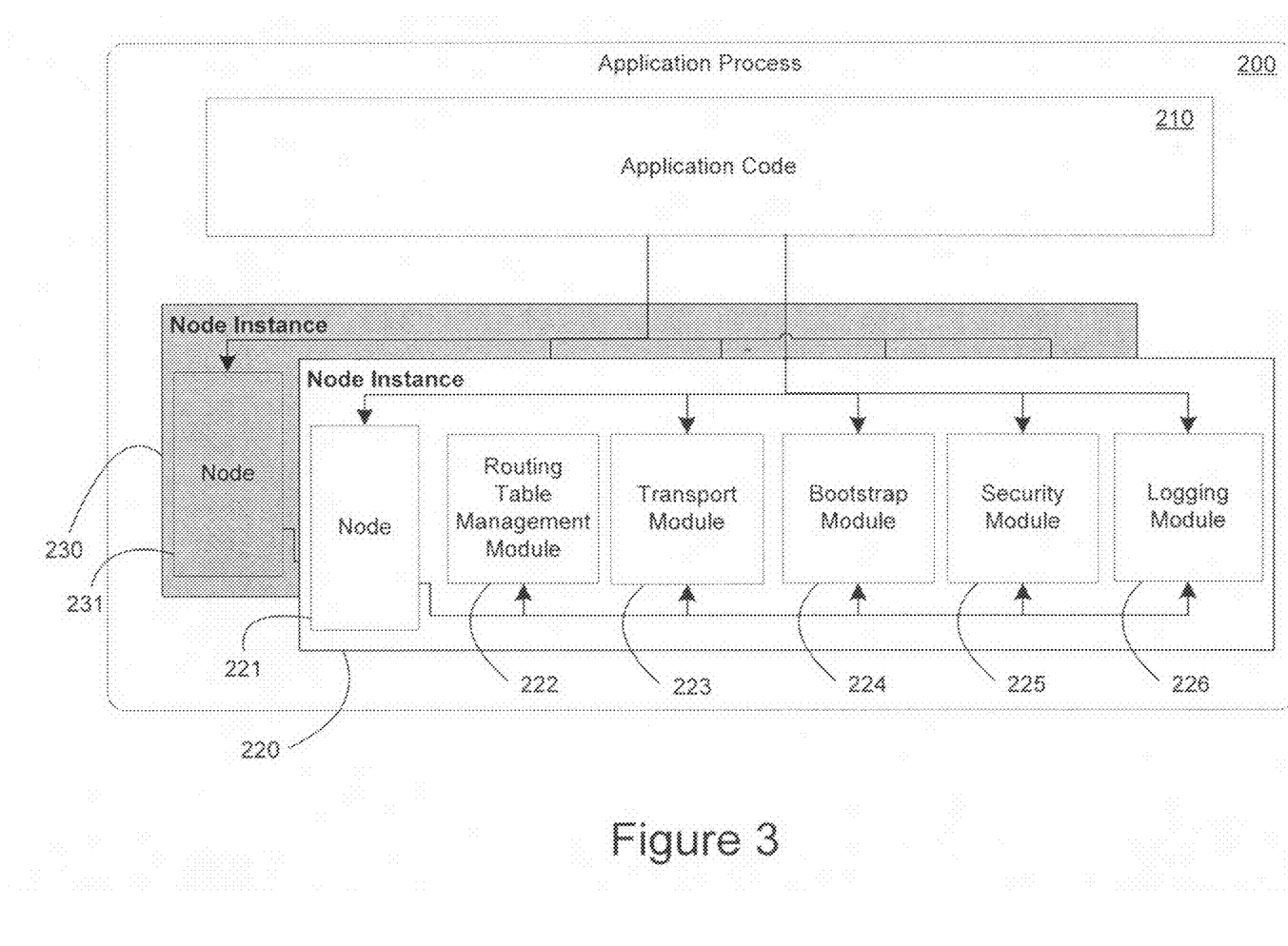
FIG. 3 is a block diagram of an exemplary DRT mechanism that can be invoked by an application.

Turning to FIG. 3, an application process 200, such as would be created by one or more of the program modules 145, is shown comprising elements for communicating with other application processes through a DRT mesh, such as DRT mesh 99. In particular, the application process 200 of FIG. 3 comprises application code 210 and two node instances 220 and 230. The illustration of two node instances is meant to be exemplary only, as any number of one or more node instances can be instantiated as part of a single application process, such as the application process 200.

In one embodiment, each node instance can comprise multiple components or modules for implementing particularized tasks. Thus, as shown, the node instance 220 comprises a node 221, a routing table management module 222, a transport module 223, a bootstrap module 224, a security module 225 and a logging module 226. Node instance 230 can comprise similar modules, though only node 231 is shown in FIG. 3. Initially, as illustrated by the superior arrows of FIG. 3, the transport module 223, bootstrap module 224, security module 225 and logging module 226 can be instantiated into the application process 220 by the application code 210. Subsequently, the node 221 can be instantiated into the application process 220 by the application code 210, and can be provided pointers to the already instantiated instances of the transport module 223, bootstrap module 224, security module 225 and logging module 226, as indicated by the inferior arrows of FIG. 3. The node 221 can instantiate the routing table management module 222, and can create the node instance 220 which comprises the instantiated instances of the node 221, routing table management module 222, transport module 223, bootstrap module 224, security module 225 and logging module 226.

Each node instance 220 and 230 can represent a uniquely identifiable endpoint within a DRT mesh, such as the DRT mesh 99 of FIG. 1. Thus, each node instance 220 and 230 can be assigned a key identifier for the node instance, and each node instance can enable the application code to communicate with one or more other node instances in an independent manner. As can be seen, a single computing device and, indeed, a single application program, can host multiple node instances. Thus, while FIG. 1, and subsequently FIGS. 6 and 7, each illustrate a computing device as a single node instance, nothing in the descriptions should be read to require such a one-to-one correspondence between node instances and computing devices, or node instances and application programs executing on those computing devices.

Figure 4:
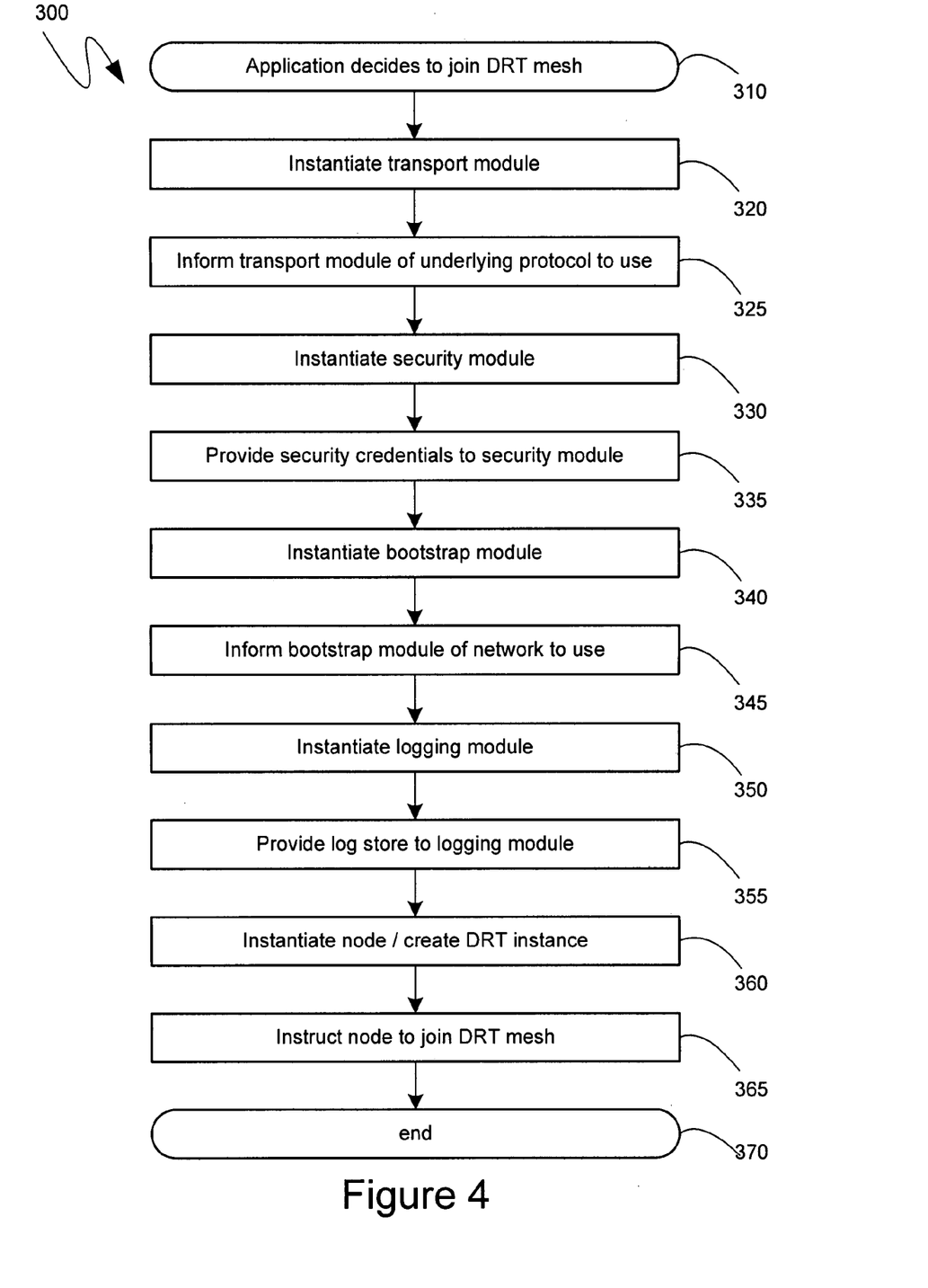
FIG. 4 is flow diagram of exemplary steps to instantiate a DRT mechanism.

Turning to FIG. 4, a flowchart 300 is shown illustrating an exemplary series of steps that can be initiated by an application program to establish a node instance, such as node instance 220 or 230 of FIG. 3. While the steps of flowchart 300 are illustrated in a particular order, the exact relationship between many of the series of steps is irrelevant and, consequently, there exist a multitude of orderings of the steps of flowchart 300 that are equivalent to the ordering shown. Generally, however, some initiating step will occur to cause the application program to undertake the illustrated steps. Thus, in FIG. 4, one such initiating step is the decision, by the application program to join a DRT mesh at step 310. Subsequent to such an initiating step, a multitude of instantiations can occur, though, as indicated, the precise order of such instantiations is not limited.

In the example illustrated by flowchart 300, at step 320, the application code 210 can instantiate the transport module 223. In one embodiment, the transport module 223 that is instantiated at step 320 is specifically designed to operate using a particular transport, and nothing further need be performed by the application code 210 to enable the transport module 223 to be utilized by the node 221. In an alternative embodiment, however, the transport module 223 can be compatible with multiple different transports. In such a case, the application code 210 can, after instantiating the transport module 223 at step 320, further inform the transport module of the underlying protocol to use at step 325.

Subsequently, at step 330, the application code 210 can instantiate the security module 225, though, as indicated previously, the instantiation of the security module can equivalently occur prior to the instantiation of the transport module 223. Once the security module is instantiated, the application code 210 can provide appropriate security credentials to the security module at step 335. Such security credentials can include private and public key pairs used by the application code 210, and a public key certificate. In one embodiment, the public key certificate provided at step 335 can be derived from a root certificate common to all of the application programs communicating though the DRT mesh.

After instantiating the security module 225 and providing it with relevant information at steps 330 and 335, the application code 210 can, at step 340, instantiate the bootstrap module 224. Alternatively, as indicated previously, the instantiation of the bootstrap module 224 can also, equivalently, occur prior to either or both of the instantiation of the transport module 223 and the security module 225. In one embodiment, the bootstrap module 224 is specifically designed to operate using a particular network from which to initiate communication with a DRT mesh, and nothing further need be performed by the application code 210 to enable the bootstrap module 224 to be utilized by the node 221. In an alternative embodiment, the bootstrap module 224 can be more flexible, in which case the application code 210 can, after instantiating the bootstrap module 224 at step 340, further inform the bootstrap module, at step 345, of a specific network to use.

Before instantiating the node at step 360, the application code 210 can instantiate the logging module 226 at step 350. As with the instantiations of steps 320, 330 and 340, the instantiation of the logging module 226 need not occur in any particular order with respect to the instantiation of the transport module 223, security module 225, or the bootstrap module 224 and could, equivalently, occur before any or all of such instantiations. Subsequently, at step 355, the application code 210 can inform the logging module 226 of the name and location of the log store to be used. Alternatively, each logging module, such as the logging module 226, can be designed to use a particular log store, in which case step 355 would not be performed.

After the transport module 223, bootstrap module 224, security module 225 and the logging module 226 have been instantiated by the application code 210, the application code can proceed to instantiate the node 221 and, thus, create a DRT instance, such the DRT instance 220. Thus, as shown in flowchart 300, at step 360, the application code 210 can instantiate the node 221. The application code 210 can further pass pointers to the instantiated instances of the transport module 223, bootstrap module 224, security module 225 and the logging module 226 to the node 221, thereby enabling the node 221 to communicate with and make use of the transport, bootstrap, security and logging modules. The node 221 can then create the DRT instance 220, and can further instantiate the routing table management module 222.

Once the DRT instance 220 has been created, the application code 210 can, at step 365, instruct the node 221 to join a DRT mesh, such as the DRT mesh 99 of FIG. 1. At step 370, the initial processing by the application code 210 in joining a DRT mesh can end.

Figure 5:
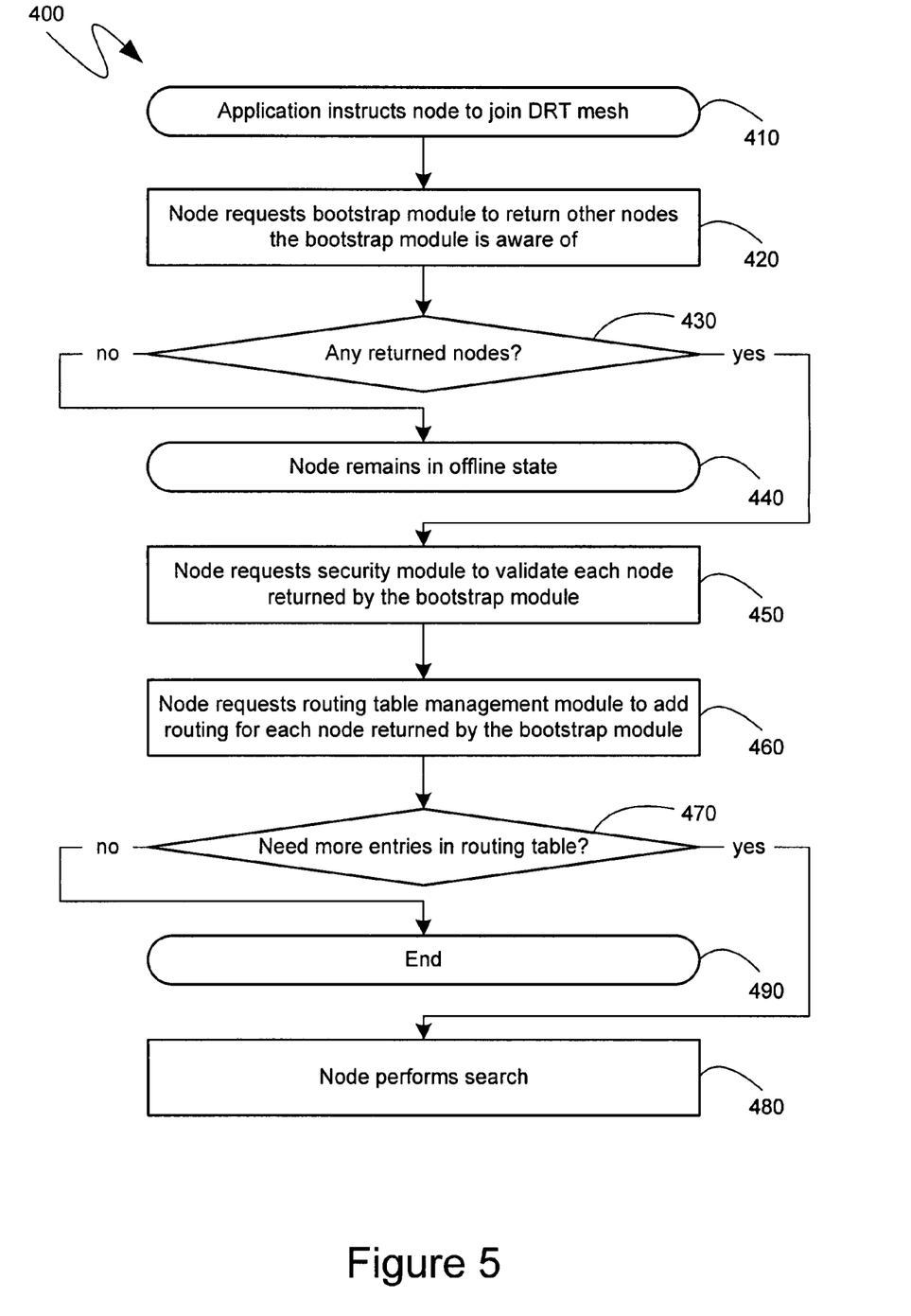
FIG. 5 is a flow diagram of exemplary steps to join a DRT network.

To join a DRT mesh, such as in response to step 365, the node 221 can utilize the instantiated routing table management module 222, transport module 223, bootstrap module 224, security module 225 and logging module 226. Turning to FIG. 5, a flowchart 400 illustrates an exemplary series of steps performed by the node 221 to join a DRT mesh. Initially, as shown, the node 221 can, at step 410, receive a request from application code 210 to join at DRT mesh. Subsequently, the node 210 can request that the instantiated bootstrap module 224 provide a listing of the other nodes, in the DRT mesh that the application is attempting to join, of which the bootstrap module is aware. If the bootstrap module 224 does not return any nodes, as determined by step 430, then, at step 440 the node 221 can remain in an offline state.

In one embodiment, if the bootstrap module 224 does not return any nodes, the application code 210 can request the bootstrap module to publish its availability, or the bootstrap module can automatically publish its availability. More specifically, to enable at least two nodes to initially communicate to form a DRT mesh in the first place, a prearranged rendezvous can be used by the bootstrap module 224. Such a rendezvous can take the form of a publication or registration, made within the context of another network, announcing the availability of the node instance 220 and its willingness to form a DRT mesh. Specifically, the bootstrap module 224 can use the particular peer-to-peer protocol, or other name resolution protocol, that was used by, for example, the computing devices 10, 20, 30, 40 and 50 to form the network 90. In one embodiment, specific individual bootstrap modules can be tailored to a particular protocol, such as the Peer Name Resolution Protocol (PNRP), thereby enabling an application to form a DRT mesh over networks depending on various name resolution protocols by simply instantiating an appropriate bootstrap module.

Once the bootstrap module 224 has used the name resolution protocol of network 90 to announce the presence of node instance 220, it can wait for another node to become active on the network 90. Such a subsequent node can then check, via the prearranged rendezvous point within network 90, whether any other node, such as the node instance 220, is available to create a DRT mesh. The subsequent node can, thereby, learn of the existence of node instance 220, and the two nodes can proceed to communicate to form a DRT mesh.

If, however, at step 430, it is determined that at least one node was returned by the bootstrap module 224, then the node 221 can proceed to join or establish a DRT mesh with that node. As indicated, if a single node had previously published, in a prearranged way on network 90, its availability to form a DRT mesh, such a node could be returned by the bootstrap module 224 at step 430. Similarly, if multiple nodes have already formed a DRT mesh, one or more of such nodes can also be returned by the bootstrap module 224 at step 430. In either case, at step 450, the node 221 can request the security module 225 to validate one or more of the nodes returned by the bootstrap module 224.

To enable the node instance 220 to more quickly develop a useful routing table, the nodes returned by the bootstrap module 224 can provide, to the node instance 220, information regarding other nodes of which those nodes are aware. Such information can also be validated by the security module 225.

In one embodiment, the security module 225 can validate nodes identified and provided by the bootstrap module 224 by verifying both that the information received from the node was properly signed by the certificate that accompanied it, and that the certificate is properly derived from the root certificate. For example, the information received from a node can identify the node with a unique key number. To prevent a malicious entity from pretending to be that node by providing information that uses the same key number, a certificate can be used to sign the information received, including the key number. Using known cryptographic techniques, the security module 225 can verify that the information received, including the key number, was properly signed by the certificate provided. For example, the security module 225 can use the public key provided in the certificate to verify that the information provided, and the key number, were signed by the corresponding private key. Additionally, in one embodiment, the key number can be derived from the public key of the publisher, thereby enabling the security module to further verify the key number. After using the certificate to verify the contents of the message, the security module 225 can further verify that the certificate is either a pre-approved root certificate, or is part of a certificate chain that includes a pre-approved root certificate. By using a root certificate, as opposed to self-signed certificates, the DRT mesh can be made more secure and the security can have greater flexibility.

Once the security module 225 has validated, at step 450, the nodes returned by the bootstrap module 224, the node 221 can, at step 460, request that the routing table management module 222 add the verified nodes, and the relevant routing, to the routing table maintained by node instance 220. In one embodiment, the routing table management module 222 can decide to add one or more of these nodes only if those nodes are closer in the network topology to the computing device hosting node instance 220 than one or more of the nodes already in the routing table. In an alternative embodiment, the routing table management module 222 can initially add some or all of the nodes returned by the bootstrap module 224, and verified by the security module 225, to the routing table of the node instance 220. Subsequently, the routing table management module 222 can determine if the number of entries in the routing table off the node instance 220 exceeds a predetermined threshold. If such a threshold is exceeded, entries can be removed based on the distance, in the network topology, between the node referenced by the entry in the routing table and the computing device hosting node instance 220. More specifically, those entries having a greater distance can be removed in favor of entries that represent closer nodes. Such a pairing down of the routing table by the routing table management module can occur on a period basis or when requested by the application code 210 or the node 221, or otherwise triggered, such as by a process that monitors the number of entries in the routing table.

Within a network topology, the distance between nodes, or the distance between the computing devices hosting those nodes, can be defined, not by the physical distance between the nodes, but by the distance of the communicational pathway between the nodes. Indeed, a network topology often does not conform to physical topologies. For example, a computing device connected to a corporate network may be able to more efficiently communicate to other computing devices connected to the same corporate network, even if those computing devices are in other cities, than such a computing device would be able to communicate to another computing device connected to a different corporation's network, even if this other device was located only a few blocks away. The communicational pathway between two computing devices on the same network subsection can be short and straightforward, even if the two computing devices are physically separate from one another, while the communicational pathway between two computing devices on different network subsections can require an extensive amount of inter-network transfers and can be, therefore, fairly long and complex.

To determine how close a node is, the routing table management module 222 can, in one embodiment, measure the round trip time of a message sent from the node instance 220 to the node whose distance is being measured. Nodes having the shortest round trip time are deemed to be "closer," and are, therefore, retained in the routing table. In another embodiment, the routing table management module 222 can determine which node is "closer" based on a comparison of characteristics of an Internet Protocol (IP) address of the computing device hosting the node whose distance is being evaluated with characteristics of the IP address of the computing device hosting the node instance 220. In a still further embodiment, a combination of the two previously described embodiments can be used. For example, the routing table management module 222 can initially measure the round trip time, but if two or more nodes are measured have similar round trip times and, therefore, deemed to be approximately of equal network topological distance from the node instance 220, the node having a more similar IP address can be selected for inclusion in the routing table.

When initially joining a DRT mesh, however, a more likely scenario is that the routing table has too few entries. If the routing table management module 222 determines that the routing table requires additional entries, it can request that the node 221 perform a search in the DRT mesh to obtain additional node information. As shown in the flowchart 400 of FIG. 5, at step 470, the node 221 can receive such a request to obtain additional node information. If no such request is received at step 470, the processing performed by the node 221 to join the DRT mesh can end at step 490. However, if a request for addition node information is received at step 470, the node 221 can perform a search of the DRT mesh at step 480.

Figure 6:
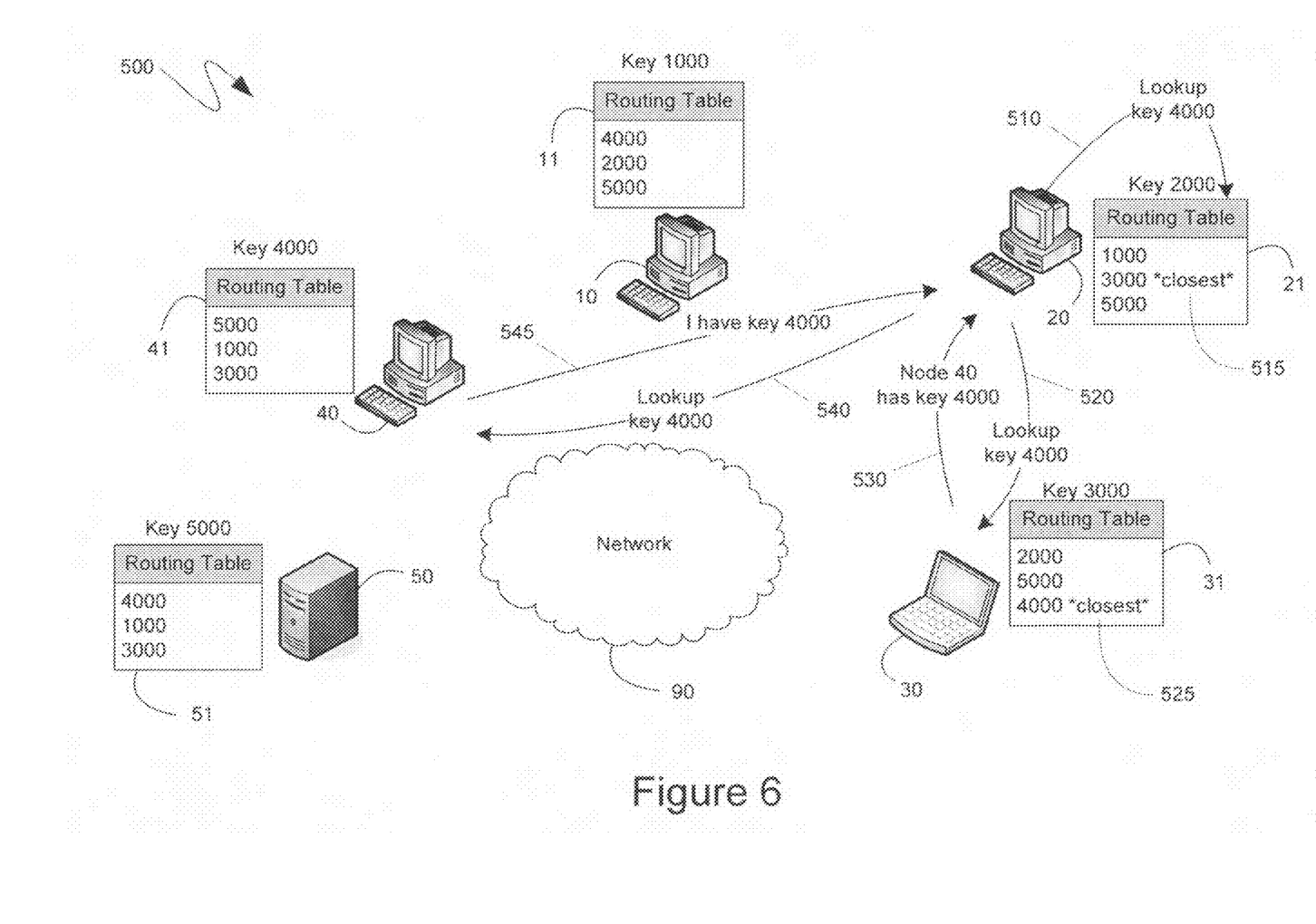
FIG. 6 is a communicational diagram of an exemplary series of communications enabling the registering of a computing device with a DRT network.

One mechanism by which a search of a DRT mesh can be performed is illustrated by communicational flow 500 of FIG. 6. Initially a node, such as the node identified by key 2000 and hosted by computing device 20, can identify a key number associated with the node being searched for. The searching node need not be certain of the existence of the searched-for node, since a search for any key will return those nodes that are identified by keys approximately equal to the searched-for key. In the example illustrated by the communicational flow 500, the node identified by key 2000 can search for a node identified by the key 4000. Initially, as illustrated by communication 510, the node, such as node 221, can request the routing table management module 222 to look up the searched for key 4000 in the local routing table 21. In response, the routing table management module 222 can return to the node 221, either the routing to the searched for key, or the routing to the key that is closest to the searched-for key. In the particular example illustrated in FIG. 6, the searched-for key 4000 is not present in routing table 21. Thus, the routing table management module 222 can provide, to the node 221, the routing to the node identified by the key 3000, which is the closest key to the searched-for key 4000 that is present in the routing table 21.

With the routing to the node identified by the key 3000, the node 221 can establish communication with the node identified by the key 3000 and request that that node look up the node identified by the searched-for key 4000 in its routing table. Thus, as shown in FIG. 6, such a request can be made in the form of communication 520 from the computing device 20, which can be considered to host the node instance 220 of FIG. 3, to the computing device 30, which, in the exemplary DRT mesh 99 of FIG. 6, hosts the node identified by the key 3000. The routing table 31 of the node identified by the key 3000 does, in the illustrated embodiment of FIG. 6, comprise an entry for the searched-for node identified by the key 4000. Consequently, after identifying the entry 525 in the routing table 31, the node identified by the key 3000 can respond, via communications 530, to the node 221, informing it of the routing to the node identified by the key 4000.

In one embodiment, prior to determining that the searched-for node identified by the key 4000 has been located, the node 221 can send a communication 540 to the node identified by the key 4000 requesting that that node likewise search its routing table to for the node identified by the key 4000. Such a message can be known as an "inquire" message, and is illustrated via communication 540 in FIG. 6 from the computing device 20, hosting node 221, to the computing device 40 which, in the example illustrated in FIG. 6, hosts the node identified by the key 4000. To ensure that the message responding to the inquire message 540 was not retrieved and replayed from some other node, the inquire message can include a token "nonce" that can be randomly generated. The subsequent response message can then include this token and the signature for that message can be computed with reference to this token.

Upon receipt of communication 540, the node identified by the key 4000 can respond that it is, indeed, the node that node 221 is searching for. Thus, as illustrated in FIG. 6, communication 545 from the computing device 40 hosting the node identified by the key 4000, to the computing device 20 hosting node instance 220, can indicate that the responding node is identified with key 4000. Such a message can be known as an "authority" message and can be digitally signed and transmitted with a certificate comprising a public key. As indicated, the authority message can also include the random nonce from the inquire message 540 and the signature in the certificate can be computed with reference to the nonce. In addition, the node 221 can, upon receipt of communication 545, request that the security module 225 verify that the authority message is properly signed and that the certificate either is a proper root certificate or is part of a certificate chain that includes a proper root certificate.

Once the security module 225 has verified the authority message, thereby verifying for the node 221 that it has, indeed, found the node identified by the searched-for key 4000, the node 221 can provide the application payload to the application code 210. The application payload is the information that the remote application represented by the node identified by key 4000 registered with that key. In one embodiment, the application payload can be the IP address, or other common network address, of the computing device 40 hosting the remote application. In such a case, once the application code 210 receives the IP address, it can proceed to communicate with the remote application using traditional TCP/IP communications.

Figure 7:
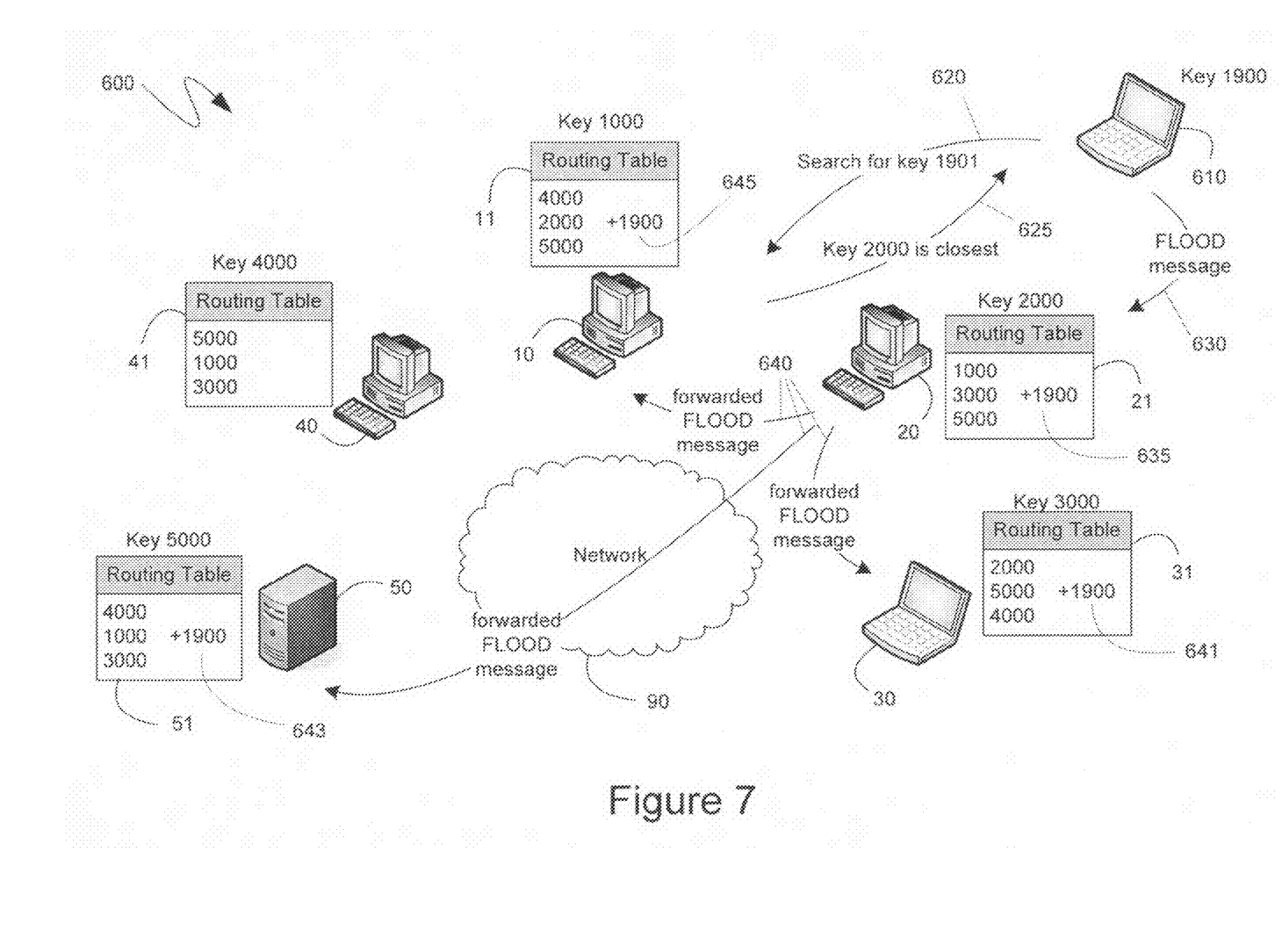
FIG. 7 is a communicational diagram of an exemplary series of communications enabling the searching for a computing device on a DRT network.

In one embodiment, the searching for another node, such as in the manner just described, can be performed by any node of the DRT mesh 99. In an alternative embodiment, however, only nodes that are registered within the DRT mesh 99 can be allowed to search. To register itself with the DRT mesh 99, a node, such as the node 221 can publish a key, or other identifying value, to one or more of the other nodes of the DRT mesh. Turning to FIG. 7, a communicational flow 600 is shown, illustrating an exemplary series of communications which can enable the node hosted by computing device 610 to register itself as part of the DRT mesh 99. Initially, in one embodiment, the node hosted by computing device 610, such as node 221 of node instance 220, can request the security module 225 to generate a unique key which can be used to identify the node instance 220 within the DRT mesh 99. In an alternative embodiment, depending on the functionality of the security module 225, the node 221 can, simply, itself select an identifying key to be used in registering the node in the DRT mesh 99. In the example illustrated in FIG. 7, the key 1900 can be selected to identify the node instance 220 hosted by computing device 610.

To register itself with the DRT mesh 99, the node 221 can initially perform a "resolve" operation, whereby a node having a key close to the selected key for the node instance 220 is identified. In one embodiment, the resolve operation can be performed by incrementing the key 1900 by one and then searching the DRT mesh 99 for the new key value, namely 1901 in the present example. Thus, as illustrated in the communicational flow diagram 600, communication 620 from the computing device 610 can search for the key 1901. For simplicity, the search request 620 is illustrated as generally being directed to the DRT mesh 99, instead of a particular node of the DRT mesh, though, as described in detail above, such search requests are initially directed to a node having a similar key stored in the routing table maintained by the searching node, and are then redirected by each subsequent node, as appropriate. Similarly, for simplicity, a search response communication 625 is illustrated as generally coming from the DRT mesh 99, as opposed to a particular node, though, again as described in detail above, such search responses can be received from one or more nodes that were contacted by the searching node.

In the example illustrated in FIG. 7, the response communication 625 can indicate that the node identified by key 2000 has the closest key to the searched-for key of 1901. Once the node instance 220, which is attempting to register itself with the DRT mesh 99 using key 1900, is aware of the node identified by key 2000, it can send it a "flood" message 630, announcing the presence of the node instance 220 as part of the DRT mesh and providing the identifying key 1900. In response to receiving a flood message, a node can, initially use a security module to verify that the flood message was properly signed and that the associated certificate is either an approved root certificate, or is part of a certificate chain that includes the approved root certificate. Once the flood message is verified, the receiving node, such as the node identified by the key 2000 in the example illustrated in FIG. 7, can add the received key and routing information into its routing table 21. Thus, as shown, an entry 635 for key 1900 can be added to the routing table 21 of the node identified by the key 2000.

In addition to adding the key 1900 to its routing table 21, the node identified by key 2000 can further, in response to the flood message 630, forward the flood message to the other entries in its routing table 21, with the assumption that such other entries may also wish to learn of the new node. Thus, as illustrated in FIG. 7, the node identified by the key 2000 can send forwarded flood messages, via communication 640, to the other nodes in its routing table 21, namely the nodes identified by keys 1000, 3000 and 5000. Upon receipt of the forwarded flood messages 640, each of the receiving nodes can respond in a manner similar to the node identified by key 2000 when it received the flood message 630; namely, each of the receiving nodes identified by keys 1000, 3000 and 5000 can add the node identified by key 1900 to their respective routing tables 11, 31 and 51 if their respective security modules verify the forwarded flood messages 640.

Once the routing information for the node corresponding to key 1900 is stored in one or more routing tables of other nodes comprising the DRT mesh 99, the node corresponding to key 1900 can be considered to be registered as part of the DRT mesh. In another embodiment, a minimum number of nodes must have entries in their routing tables corresponding to the node identified by key 1900 for the node to be considered a registered node of the DRT mesh 99. In such a case, the nodes receiving the forwarded flood message 640 can, themselves, further forward the flood message to the nodes identified in the receiving nodes' routing tables. If a node receives a flood message from more than one source, it can merely ignore the duplicate flood messages. Nevertheless, by forwarding the flood message multiple times, a greater number of nodes' routing tables can be updated with the key and routing information contained in the flood message, enabling the node sending the flood message to register itself in the DRT mesh 99 that much more efficiently.

As can be seen from the above descriptions, a DRT mesh can be created, maintained and utilized by nodes having componentized modules implementing various defined tasks, including a security module that can provide for the use of root certificates to verify messages, and a routing table management module that can provide for a routing table comprising entries that are close, taking into account network topology, to the node. In view of the many possible variations of the subject matter described herein, we claim as our invention all such embodiments as may come within the scope of the following claims and equivalents thereto.

We claim:

1. One or more computer-readable storage media comprising computer-executable instructions for creating a node instance, the node instance representing an endpoint of a distributed routing table mesh, the computer-executable instructions directed to steps comprising:

selecting a transport module, from among multiple existing transport modules that are interchangeable with one another, each providing communications using differing network protocols, in accordance with a network protocol associated with the distributed routing table mesh;

instantiating the transport module;

selecting a bootstrap module, from among multiple existing bootstrap modules that are interchangeable with one another, each tailored to differing name resolution protocols, in accordance with a name resolution protocol associated with peer-to-peer communications among other nodes of the distributed routing table mesh;

instantiating the bootstrap module;

selecting a security module, from among multiple existing security modules that are interchangeable with one another, each implementing differing security strategies, in accordance with one or more security mechanisms associated with the distributed routing table mesh;

instantiating the security module;

instantiating a routing table management module for managing entries in a routing table associated with the node instance, the routing table comprising only a portion of routing information available in the distributed routing table mesh, wherein the routing table management module filters entries of the routing table associated with the node instance to retain those entries that are closer, according to a network topology, to the node instance than those entries that are not retained; and instantiating a node module for utilizing the transport module, the bootstrap module, the security module and the routing table management module to participate in the distributed routing table mesh.

2. The computer-readable storage media of claim 1, wherein the one or more security mechanisms associated with the distributed routing table mesh comprise a certificate-based security mechanisms based on at least one root certificate.

3. The computer-readable storage media of claim 2, wherein the security module comprises computer-executable instructions for verifying a message received from another node instance in the distributed routing table mesh by referencing a certificate associated with the other node instance to ensure that the certificate is chained to the at least one root certificate.

4. The computer-readable storage media of claim 1 comprising further computer-executable instructions for creating a second node instance, the computer-executable instructions performing steps comprising: instantiating a second node module for utilizing a second transport module, a second bootstrap module and a second security module to participate in the distributed routing table mesh.

5. The computer-readable storage media of claim 1, wherein the node module comprises computer-executable instructions for: requesting the bootstrap module to enumerate other nodes of the distributed routing table mesh, requesting the security module to verify the enumerated other nodes provided by the bootstrap module, and requesting a routing table management module to add the verified, enumerated other nodes to a routing table associated with the node instance.

6. The computer-readable storage media of claim 1, wherein the node module comprises computer-executable instructions for: requesting a key from the security module to be associated with the node instance, identifying another node associated with another key, the other key being closest in value to the key, and sending a flood message, comprising the key, to the other node.

7. A method for creating a node instance, the node instance representing an endpoint of a distributed routing table mesh, the method comprising the steps of:

selecting a transport module, from among multiple existing transport modules that are interchangeable with one another, each providing communications using differing network protocols, in accordance with a network protocol associated with the distributed routing table mesh;

instantiating the transport module;

selecting a bootstrap module, from among multiple existing bootstrap modules that are interchangeable with one another, each tailored to differing name resolution protocols, in accordance with a name resolution protocol associated with peer-to-peer communications among other nodes of the distributed routing table mesh;

instantiating the bootstrap module;

selecting a security module, from among multiple existing security modules that are interchangeable with one another, each implementing differing security strategies, in accordance with one or more security mechanisms associated with the distributed routing table mesh;

instantiating the security module;

instantiating a routing table management module for managing entries in a routing table associated with the node instance, the routing table comprising only a portion of routing information available in the distributed routing table mesh, wherein the routing table management module filters entries of the routing table associated with the node instance to retain those entries that are closer, according to a network topology, to the node instance than those entries that are not retained; and instantiating a node module for utilizing the transport module, the bootstrap module, the security module and the routing table management module to participate in the distributed routing table mesh.

8. The method of claim 7, wherein the one or more security mechanisms associated with the distributed routing table mesh comprise a certificate-based security mechanisms based on at least one root certificate.

9. The method of claim 8, wherein the security module verifies a message received from another node instance in the distributed routing table mesh by referencing a certificate associated with the other node instance to ensure that the certificate is chained to the at least one root certificate.

10. The method of claim 7, further comprising the steps of: instantiating a second node module, for creating a second node instance to participate in the distributed routing table mesh, the second node module utilizing a second transport module, a second bootstrap module and a second security module.

11. The method of claim 7, wherein the node module comprises computer-executable instructions for: requesting the bootstrap module to enumerate other nodes of the distributed routing table mesh, requesting the security module to verify the enumerated other nodes provided by the bootstrap module, and requesting a routing table management module to add the verified, enumerated other nodes to a routing table associated with the node instance.

12. The method of claim 7, wherein the node module comprises computer-executable instructions for: requesting a key from the security module to be associated with the node instance, identifying another node associated with another key, the other key being closest in value to the key, and sending a flood message, comprising the key, to the other node.

* * * * *